324-7?

CROSS REFERENCE SEARCH ROOM

June 8, 1965 E. FELIX 3,188,564
APPARATUS FOR CLASSIFYING SPORADICALLY OCCURRING DIFFERENT DEFECTS IN MATERIAL BY CONVERTING DEFECT CAUSED OUTPUT SIGNALS INTO A FUNCTION OF TIME
Filed Feb. 29, 1960 3 Sheets-Sheet 1

INVENTOR.
ERNST FELIX.
BY
K.A. Mayr
ATTORNEY.

June 8, 1965 E. FELIX 3,188,564

APPARATUS FOR CLASSIFYING SPORADICALLY OCCURRING DIFFERENT DEFECTS IN MATERIAL BY CONVERTING DEFECT CAUSED OUTPUT SIGNALS INTO A FUNCTION OF TIME

Filed Feb. 29, 1960

3 Sheets-Sheet 2

INVENTOR.
ERNST FELIX.
BY
K. B. Mayr
ATTORNEY.

June 8, 1965 E. FELIX 3,188,564

APPARATUS FOR CLASSIFYING SPORADICALLY OCCURRING DIFFERENT DEFECTS IN MATERIAL BY CONVERTING DEFECT CAUSED OUTPUT SIGNALS INTO A FUNCTION OF TIME

Filed Feb. 29, 1960 3 Sheets-Sheet 3

INVENTOR.
ERNST FELIX.
BY
K. B. Mayr
ATTORNEY

United States Patent Office 3,188,564

Patented June 8, 1965

3,188,564

APPARATUS FOR CLASSIFYING SPORADICALLY OCCURRING DIFFERENT DEFECTS IN MATERIAL BY CONVERTING DEFECT CAUSED OUTPUT SIGNALS INTO A FUNCTION OF TIME

Ernst Felix, Uster, Switzerland, assignor to Zellweger Ltd., Uster Factories for Apparatus and Machines, Uster, Switzerland, a corporation of Switzerland Filed Feb. 29, 1960, Ser. No. 11,850
Claims priority, application Switzerland, Mar. 2, 1959, 70,245/59
2 Claims. (Cl. 324—61)

The present invention relates to an apparatus for classifying sporadically occurring phomena in a variable function, such as defects in the weight per unit of length of a textile material, or the like.

It is known in the manufacture of textile products, particularly in the spinning of yarns, that various kinds of defects occur in the product.

One type of defect in the yarn, for instance, is due to random fluctuations of weight per unit of length of the product. Such fluctuations of weight are caused by the random distribution of the fibers. A further kind of defect in yarn is due to improper operation of spinning machinery causing substantially periodical or quasi-perodical variations in weight per unit of length. These periodical or quasi-periodical variations are superimposed on the first mentioned defects which are due to the random distribution of fibers and therefore are very difficult to detect.

Although the unevenness of the yarn, which is caused by randomly occuring defects, is almost unnoticeable in the finished fabric, the periodical or quasi-periodical variations in weight per unit of length cause, for instance, undesired changes in the pattern of finished fabrics. This led to the development of special analyzers which afford the detection of periodical or quasi-periodical variations in weight per unit of length in yarns. An analyzer for detecting periodical or quasi-periodical variations in textiles is disclosed, for instance, in Patent No. 2,950,435 to Locher et al.

Aside of the above periodical or quasi-periodical variations or defects there exist so-called sporadical variations or defects which also influence the appearance of finished fabrics. Such sporadic weight variations are, for example, neps, long thick places, naps, bolls and the like; they cannot be detected by any kind of known wave analyzers.

It is, therefore, one of the major objects of the present invention to provide means for instantaneously indicating sporadic variations of weight per length unit of a textile material such as a yarn or the like and which means as a result of said indication provide possibilities to reduce the above mentioned defects which are serious drawbacks in the manufacture of textile materials.

The yarn defects which are caused by sporadic variations of weight per unit of length of yarn shall hereafter be called sporadic defects or simply defects. Compared with each other these sporadic defects may vary considerably as to their cause as well as to their appearance. Accordingly, there are various terms used in the art for classifying said sporadic defects, for example neps, thick places, fly, piecings, naps, bolls, and several other such terms.

It is another object of the invention to provide means for classifying said sporadic defects and for sorting different sporadic defects into different classes.

It is still a further object of the present invention to provide means for indicating different defects.

Another object of the invention is to provide means for indicating the frequency of occurrence of defects.

It is a further object of the present invention to provide means for indicating the cause of specific defects.

It is still a further object of the invention to provide means for indicating the source of specific defects.

It is another object of the invention to provide means for giving such indications of specific defects that conclusions for removing said defects from the product are easily made.

It is, for example, possible to remove at least one kind of sporadic defects in yarns by differently tooling and gearing certain textile machines. In order to obtain an information whether the different tooling or tool adjustment caused an improvement in avoiding a specific sporadic defect, it is necessary to have an indication of the frequency of occurrence of said specific sporadic defect.

It is, therefore, another object of the invention to provide means which indicate the frequency of occurrence of a specific defect.

There are methods and devices known in the art which count the sporadic defects in a yarn, roving, or sliver by employing electrical, optical, pneumatical or mechanical means for said counting.

It is a drawback of these known counting methods and devices that they provide only a crude indication of the total sum of defects in a certain length of product. These known methods and devices do not provide discrimination between different kinds of types of sporadic defects.

The invention removes this drawback since it discriminates between different types of sporadic defects as well as between different causes of such defects.

The invention is based on the discovery that each different sporadic defect which may be measured as a variation of weight per unit of length of material causes a different wave spectrum if the function of variation of weight per unit of length of material is converted into an equivalent electrical function of time.

The basic concept of the invention is to selectively pass the different wave spectra, each of which represents a different defect, through electric filter means and to feed the output of each filter to the input of an indicator which indicates only the specific defect. One filter passes only one component at a time which is characteristic for a specific defect.

The invention, its objects, and its advantages will appear more clearly from the following specification in connection with the accompanying drawings, in which.

Figure 1:
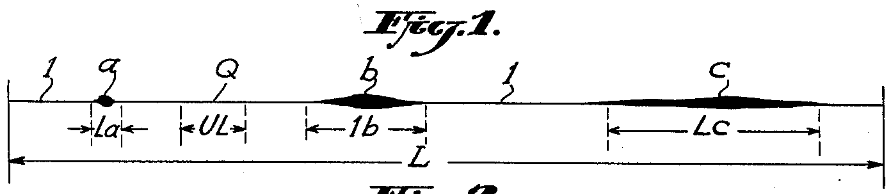
FIG. 1 shows a yarn or thread with three different defects in it.

FIG. 1 shows a yarn or thread 1 with a given length L. Defects which occur sporadically in a material such as a thread 1 may have various shapes. Three typical defects are shown in FIG. 1. Defect $a$ is a so-called "nep" with a mean length L$a$ between about .04" and about .08". Another type of defect $b$ is a so-called thick place. Its mean length L$b$ may vary between about .8" and 1.6". Still another type of defect $c$ is a so-called nap; the length L$c$ of these naps varies between about 2" and about 4".

It is known in the art to measure the weight Q of a yarn or thread as a function of unit of length by way of obtaining an equivalent electrical function. This weight as a function of length L may be expressed as follows: $Q=f(L)$. For example, the device disclosed in Patent No. 2,516,768 and in Patent No. Re. 23,368 performs such weight measuring.

It is possible to convert the variable weight function into an equivalent variable, electrical function of time which may be expressed as follows: $U=f(t)$. The relation between the length in one formula and the time in the other formula is given since the thread passes with a given speed through a gauging device disclosed in the aforementioned patents.

Figure 2:
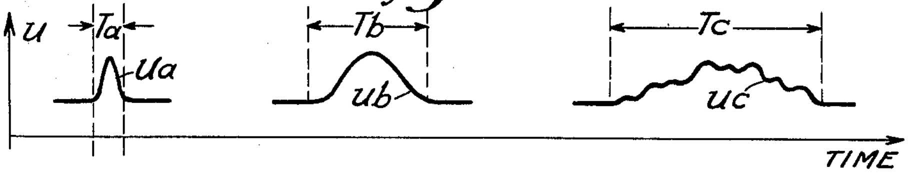
FIG. 2 illustrates three electrical functions corresponding to the defects shown in FIG. 1.

FIG. 2 illustrates the electrical function $U=f(t)$ at the appearance of three different patterns corresponding to the three different defects $a$, $b$, $c$ shown in FIG. 1. The variable, electrical function may be, for instance, a voltage or a current or any other physical unit or magnitude varying with time.

The electrical function U$a$ shown in FIG. 2 corresponds to defect $a$ which is a nep as shown in FIG. 1, while the electrical function U$b$ corresponds to defect $b$ which is shown in FIG. 1 as a thick place. The electrical function U$c$ corresponds to defect $c$, a nap according to FIG. 1. As illustrated in FIG. 1, each defect $a$, $b$, $c$ has a different mean length L$a$, L$b$, L$c$. Accordingly, each electrical function shown in FIG. 2 has a different time duration T$a$, T$b$, and T$c$. Therefore, each electrical function characterizes a specific defect.

Figure 3:
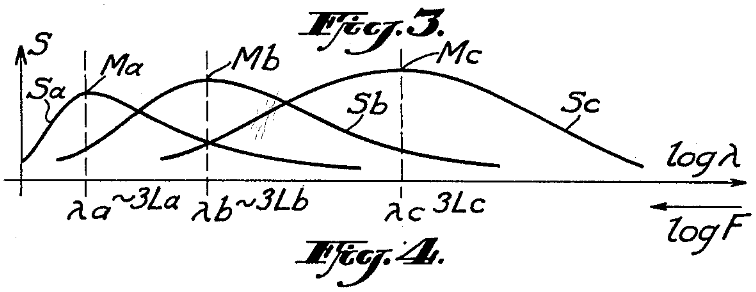
FIG. 3 illustrates three wave length spectra corresponding to the electrical functions shown in FIG. 2.

If Fourier-analysis is applied to each individual occurrence U$a$, U$b$, U$c$, in the electrical function, the results are different frequency spectra or wave length spectra as shown in FIG. 3. Said functions may be expressed as follows: $S=f(F)$ or $S=f(\lambda)$. The abscissa may be given in a logarithmic scale for the wave length $\lambda$ or for the frequency F as indicated by arrows. The functions shown in FIG. 3 correspond to the frequency spectra $S=f(F)$ of the function $U=f(t)$, if the speed of thread 1 through the test probe is taken into consideration and if log F is plotted in the opposite direction of log $\lambda$.

In FIG. 3 functions S$a$, S$b$, and S$c$ represent the wave length spectrum of functions U$a$, U$b$ and U$c$, respectively, as shown in FIG. 2.

These wave length spectra S$a$, S$b$, and S$c$ distinguish from each other substantially in that the maxima M$a$, M$b$, and M$c$ thereof occur at a specific wave length $\lambda a$, $\lambda b$, $\lambda c$, respectively. It occurs that the neps, thick places, and naps, that is each specific sporadic yarn defect, show forth a characteristic wave length spectrum; this holds true also if the specific defects of one type are not always identical with each other.

Further, it is indicated in FIG. 3 that the wave length $\lambda a$, $\lambda b$, and $\lambda c$ equals about three times the mean length L$a$, L$b$, and L$c$ of the respective defect $a$, $b$, or $c$.

Figure 4:
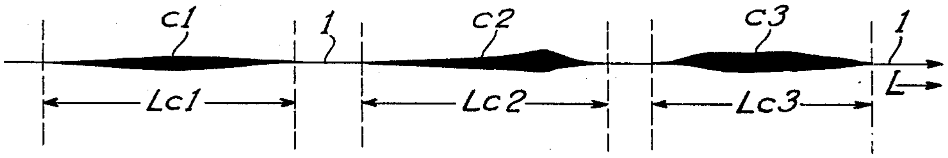
FIG. 4 shows three differently spaced thickenings in a thread.

This fact will be understood more clearly from FIG. 4 which illustrates three representative yarn thickenings of the same type which are caused by the same source of defect but which have a differently shaped curve for their weight plotted against the length of fabric.

FIG. 4 shows the yarn or thread 1 with its length L and with three defects, $c$1, $c$2, and $c$3. These three defects belong all into the same group of defects into which defect $c$ shown in FIG. 1 belongs. This is indicated by the fact that they all have about the same mean length $Lc1 \sim Lc2 \sim Lc3$. Nevertheless, these sporadic defects $c$1, $c$2, and $c$3 are all differently shaped. Consequently, they give also differently shaped curves for their corresponding electrical functions $U=f(t)$ which are shown in FIG. 5.

Figure 5:
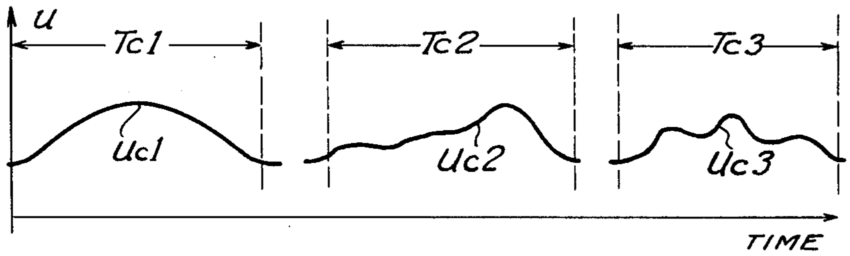
FIG. 5 illustrates three electrical functions corresponding to the three defects shown in FIG. 4.

Curve U$c$1 in FIG. 5 shows another shape than curve U$c$2 and curve U$c$3; however, all three curves U$c$1, U$c$2, and U$c$3 have about the same time duration $$Tc1 \sim Tc2 \sim Tc3$$

which also proves that these defects belong into the same class of defects.

Figure 6:
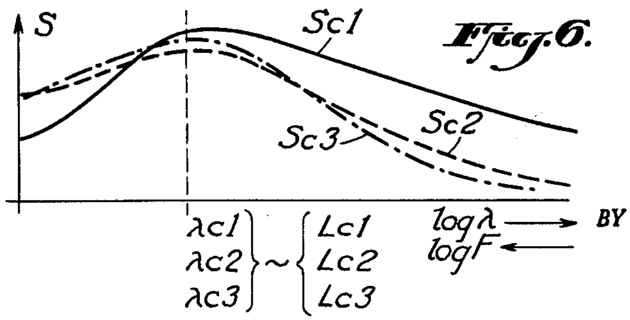
FIG. 6 illustrates three wave length spectra corresponding to the electrical functions shown in FIG. 5.

FIG. 6 shows, in an analogous manner as shown in FIG. 3, the wave length spectra as a function of wave length or frequency $S=f(\lambda)$ or $S=f(F)$ corresponding to the electrical functions shown in FIG. 5.

The evaluation of curves S$c$1, S$c$2, and S$c$3 shows, and that holds true generally, that the variations in the curves of weight per unit of length for different yarn defects, which nevertheless belong to the same type of defects, do not become effective substantially in the range of longer wave lengths ($\lambda c1 \sim 3Lc1$; $\lambda c2 \sim 3Lc2$; $\lambda c3 \sim 3Lc3$), but that these variations become effective in the range of the shorter wave lengths $$\lambda c1 \sim \lambda c2 \sim \lambda c3 \sim Lc1 \sim Lc2 \sim Lc3$$

or in other words, that they become effective in the range of the phase spectrum which will be considered later in this specification.

Due to the above-described fact, it is possible to selectively classify yarn defects by using electric filter means which are tuned to a specific frequency and thereby selectively filtering a characteristic component of the electrical functions each of which is characteristic of a specific defect.

An electrical magnitude, for instance U$b$, occurs only at the output of such a filter means which, in this instance, is tuned to the frequency spectrum S$b$, as shown in FIG. 3, if defect $b$ has passed the test probe.

Consequently, it is possible to detect at the same time with one and the same measuring procedure different types of sporadically occurring defects by using several electric filters connected in parallel and tuned to different frequencies. This is a considerable advantage, since it is possible to use a single measuring device and a single converting device for feeding several filter means. A device according to the invention is, therefore, very economical.

Another substantial advantage lies in the fact that it is possible to use a single filter for classifying different sporadic defects simply by changing the feed-through speed of the thread through the test probe of a measuring device and thereby moving the frequency spectra of other types of defects into the band-pass width of said single filter. This, of course, is even umore economical.

Figure 7:
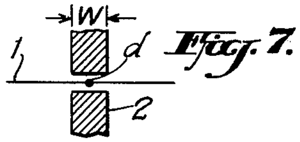
FIG. 7 shows a portion of a thread with its defect going through a measuring device.
Figure 8:
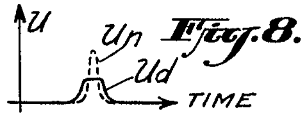
FIG. 8 illustrates the electrical function corresponding to the defect shown in FIG. 7.

FIG. 7 schematically shows a thread 1 as it passes with its defect $d$ through the test probe 2 of a measuring device. Since the test probe 2 of the measuring device has a given width W which, for instance, may be .3", the electrical function $U=f(t)$ is distorted for relatively small defects, for example, defect $a$ in FIG. 1. Accordingly, FIG. 8 shows two curves U$n$ and U$d$. The dotted curve U$n$ is the normal curve which corresponds to curve U*a* shown in FIG. 2. Curve U*d* in FIG. 8 is distorted due to the relatively short mean length of .04" to .08" of defect *d* compared to the width W of .3" of the test probe 2 of the measuring device. Due to the distortion curve U*d* shows a smaller peak value than curve U*n*. Consequently, indicators with higher sensitivity are required.

Figure 9:
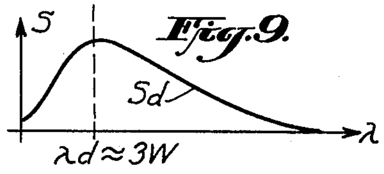
FIG. 9 illustrates the wave length spectrum corresponding to the electrical function shown in FIG. 8.

This distortion causes also a variation in the frequency- and wave length spectra as shown in FIG. 9. The wave length $\lambda d$ of distorted curve S*d* is approximately three times the width W of the test probe 2 although it should be for the undistorted curve U*n* only three times the mean length of the defect *d*. The wave length spectra of the different defects are, however, still typical and it is, therefore, possible to use the invention for defects with a relatively short mean length by adjusting the filter means to conditions due to these distortions. It must, however, be considered that the spectrum characteristic for the neps is relatively close to that of the thick places.

Figure 10:
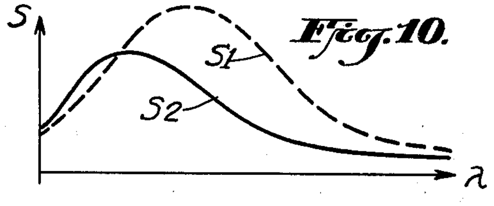
FIG. 10 shows two different wave length spectra, one of which overlaps the other to a large extent.

FIG. 10 shows the possibility that the wave length spectrum of one characteristic type of defects overlaps to a large extent the wave length spectrum of another type of defects. Spectrum S1 in FIG. 10 represents a very distinct thick place and it is so large that it overlaps almost entirely spectrum S2 which represents a nep. Consequently, a filter means designed for passing the spectrum for neps passes also the other spectrum. This passing of two spectra by the same filter means causes, of course, two indications. These indications are even more likely as the high sensitivity of an indicator means favors these indications.

Figure 11:
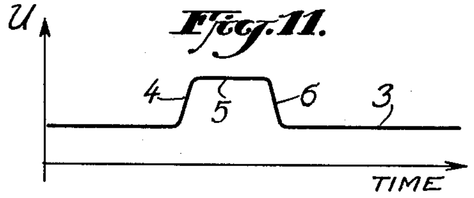
FIG. 11 shows an electrical function with a trapezoidal shape.

The above outlined problem is solved according to the invention by using a further characteristic feature of the electrical function $U=f(t)$ which occurs when a nep or a defect with a relatively short mean length passes the test probe 2 of a measuring device. FIG. 11 illustrates a curve 3 of an electrical function $U=f(t)$ which is characteristic for a nep defect. Curve 3 shows three characteristic features which are to be distinguished. First there is the leading edge 4, followed by a constant portion 5 of definite time duration and a trailing edge 6.

In order to exclusively and unmistakably attribute a curve 3 caused by a nep to this nep, it is necessary that the leading edge 4, the time duration of the constant portion 5, and the trailing edge 6 fulfill certain conditions as to steepness and duration. Accordingly, the electric filter means for classifying neps must also meet certain conditions to selectively filter a curve as shown in FIG. 11. An electric filter device meets these conditions if it comprises means which evaluate the steepness and magnitude of the leading and trailing edge as well as the time duration between said edges.

Generally speaking, it is within the purview of the invention to use, besides the frequency spectrum, also the phase spectrum to selectively classify certain types of yarn defects.

Figure 12:
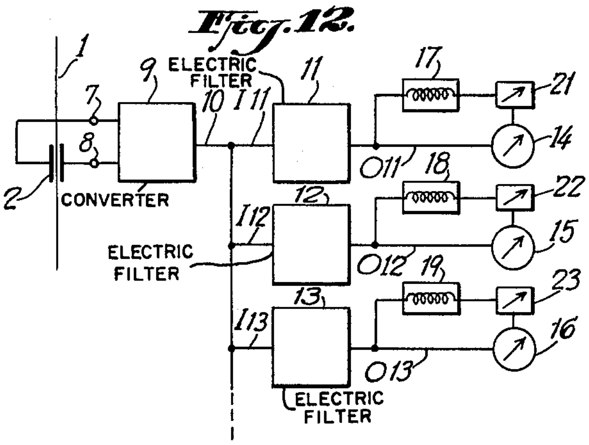
FIG. 12 shows a schematic diagram of an apparatus according to the invention.

FIG. 12 is a schematic block-diagram of an apparatus for classifying and analysing yarn defects by the method according to the invention. The yarn or thread 1 passes the test probe 2 of a weight measuring device, for example, as described in Patent No. 2,516,768.

In FIG. 12 the output terminals 7 and 8 of test probe 2 are connected to the input of a converter device 9, the output 10 of which is connected to the input of several electric filter means 11, 12, 13 whose inputs $I_{11}$, $I_{12}$, $I_{13}$ are connected in parallel. The outputs $O_{11}$, $O_{12}$, $O_{13}$ of these filters are connected to individual indicators 14, 15, 16. Each filter output $O_{11}$, $O_{12}$, $O_{13}$ is also connected to a device 17, 18, 19, respectively, for forming a mean value of the output wave form of the corresponding filter. These output wave forms are shown in FIG. 2 as curves U*a*, U*b*, U*c*. Each mean value forming device 17, 18, 19 is connected to an adjusting means 21, 22, 23 which in turn is connected with its output to a control input of the indicator devices 14, 15, 16. These indicator devices may be, for instance, meter devices, registering devices, recording devices, or the like. It is also possible to form the mean value only once at the output 10 of the device 9. This is shown in FIG. 19.

The apparatus according to the invention operates as follows:

The thread 1 is fed at a given speed through the test probe 2 which measures, in a known manner, the weight per unit of length of the thread. This weight function $Q=f(L)$ is converted by device 9 into an equivalent electrical function $U=f(t)$. The test probe 2 may scan the cross sectional area of the thread 1 either electrically, optically, pneumatically, or in any other suitable manner. The converter device 9 feeds its output signal into the filter means 11, 12, 13 which are dimensioned in such a manner that a function appears at the corresponding filter output if the signal $U=f(t)$ connected to its output contains components to be passed by said filter and which components are caused by the sporadically occurring defects in thread 1.

Figures 16, 17, 18, 19:
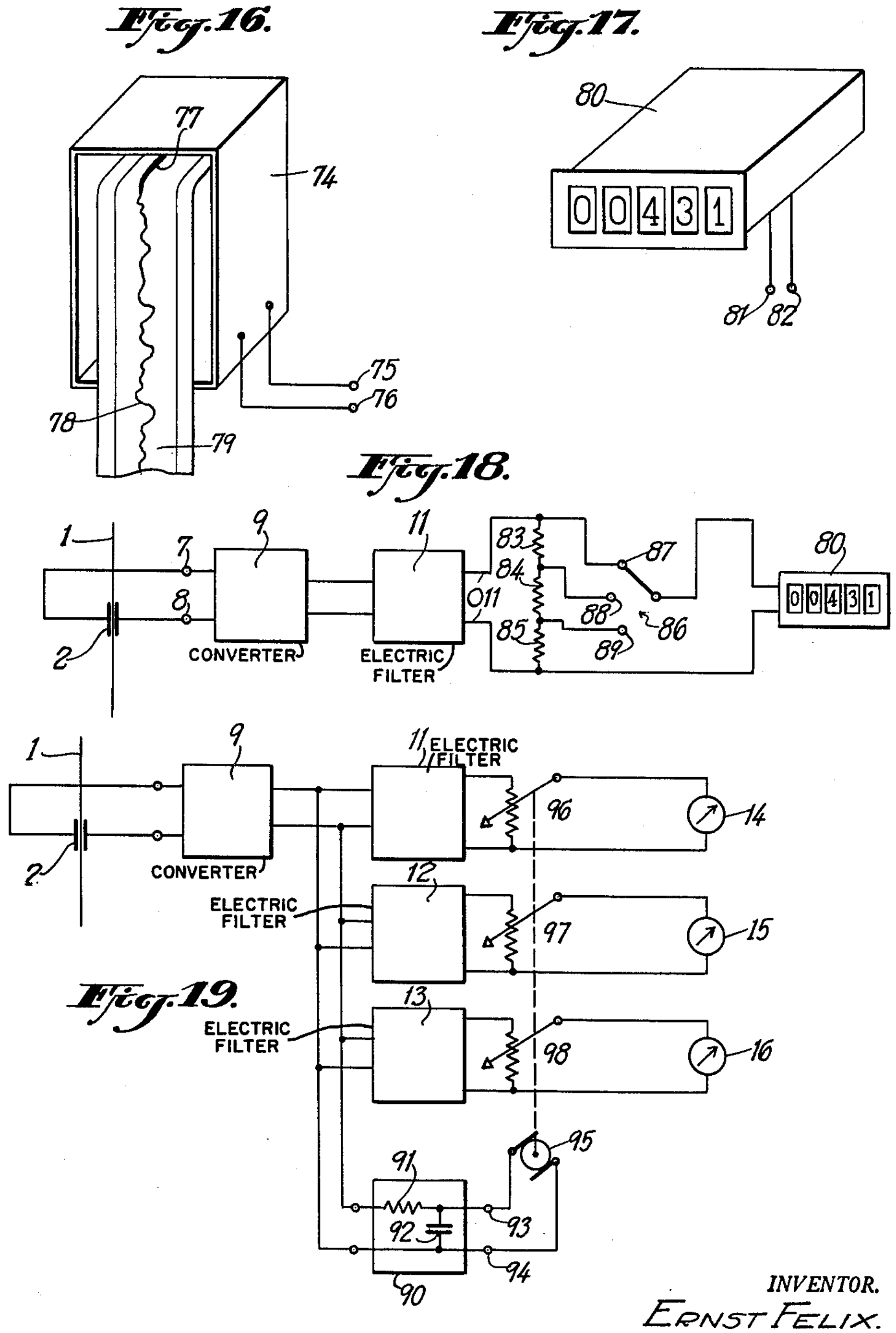
FIG. 16 illustrates a known recording device for indicating defects.
FIG. 17 shows a known counter unit for counting defects.
FIG. 18 shows a circuit arrangement connected between a filter device and an indicator.
FIG. 19 illustrates another embodiment of an apparatus according to the invention.

The indicators 14, 15, 16 may be designed in such a way that, for instance, a counter, as shown in FIG. 17, is actuated if the output voltage of the corresponding filter means reaches a certain threshold value. It is further possible to provide each indicator with several counters each of which is adjusted to be actuated by a different output voltage of the filter. By using several counters, it is achieved to indicate defects with several different sensitivities. The indicators may be of the registering or recording type.

Means 17, 18, 19, which may be low pass filters, form an approximate mean value of the output magnitude of the respective main filter. This mean value controls the adjusting means 21, 22, 23, which may be amplifiers or the like. These amplifiers in turn control the sensitivity of the indicators 14, 15, 16. It is possible to select the value of the filter output voltage which actuates the indicator, depending on said mean value. This selection has the advantage that the sensitivity of the indicators remains relatively constant with respect to said mean value.

The number of filter means to be connected to the converter device 9 is not restricted in any sense. This number depends mainly on the types of sporadically occurring defects to be classified and on the extent in which different types of yarn defects may be included in one class of defects.

Figure 13:
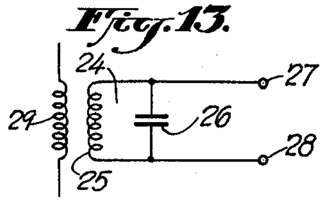
FIGS. 13 and 14 show two filter means used according to the invention.

Instead of using a plurality of filters and indicators, one filter and one indicator may be used, if the speed of the yarn passing through the test probe is altered to indicate a different type of defect at each speed. Several different electric filter means may be used. FIG. 13 shows, for instance, a filter 24 which is a parallel resonant circuit tuned to a certain frequency which is characteristic of a specific defect. Filter 24 comprises an inductance coil 25 connected in parallel to a capacitor 26. This parallel resonant circuit has output terminals 27, 28 and its input is provided by way of another coil 29 inductively coupled to the coil 25.

Figure 14:
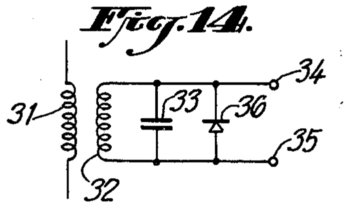

FIG. 14 illustrates a filter similar to that shown in FIG. 13. It includes an input coil 31, an inductance coil 32, a capacitor 33, and output terminals 34, 35. Further it comprises a diode 36 connected in parallel to the resonant circuit 32, 33 and in parallel to the output terminals 34, 35. The diode 36 is provided in order to set the starting conditions for a sporadically occurring defect always to an exactly defined point. This has the advantage that other variations of the electrical function $U=f(t)$, which are not due to sporadically occurring defects, *cannot* energize the resonant circuit.

It is, of course, also possible to use series resonant circuits instead of the parallel resonant circuits shown in FIGS. 13 and 14. It is further possible to obtain suitable filter characteristics by using resistor-capacitor (R, C) combinations and/or inductance-capacitor (L, C) combinations in connection with amplifiers which improve the Q-factor of the filter circuits. Filter means for certain types of yarn defects require feeding by a current or voltage which is always larger or smaller than the mean value of the electrical function $U=f(t)$.

Figure 15:
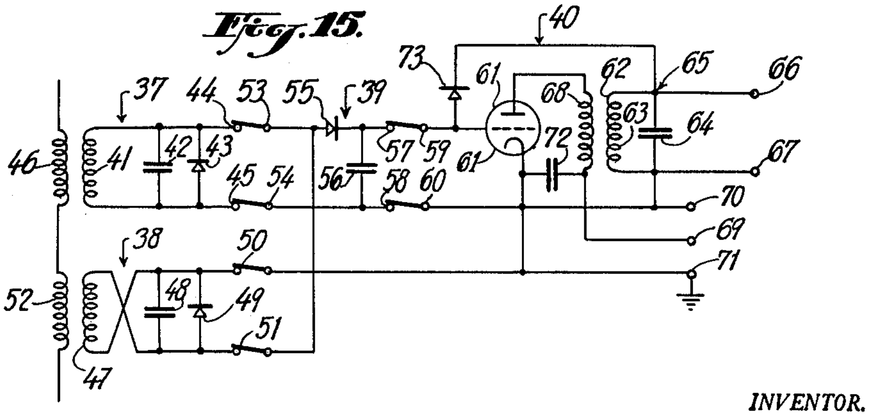
FIG. 15 illustrates diagrammatically a filter arrangement according to the invention.

FIG. 15 illustrates a specific filter means according to the invention which is designed for classifying defects, the frequency spectrum of which is largely overlapped by the frequency spectrum of another defect as shown in FIG. 10. In other words, it is particularly designed for classifying defects of the so-called nep and boll type which have a relatively small mean length compared to the width of the test probe 2 (shown in FIGS. 7 and 12).

The filter means shown in FIG. 15 comprises two parallel resonant circuits 37, 38, a storage circuit 39, and a transit time discriminator 40. Resonant circuit 37 comprises a coil 41, a capacitor 42, a diode 43, output terminals 44 and 45, and an input coil 46. Resonant circuit 38 comprises the same elements, that is, a coil 47, a capacitor 48, a diode 49, output terminals 50 and 51, and an input coil 52. Input coils 46 and 52 are connected in series with each other in order to feed the resonant circuits with the same function $U=f(t)$. Resonant circuit 38 is reversely polarized relative to circuit 37.

The storage circuit 39 comprises input terminals 53, 54, a diode 55, a storage capacitor 56 and output terminals 57, 58.

The transit time discriminator 40 comprises input terminals 59, 60, a tube 61, an output transformer 62, the secondary winding 63 of which forms with a condenser 64 connected in parallel thereto an output resonant circuit 65 with output terminals 66, 67. The discriminator 40 further comprises the primary winding 68 of the transformer 62, a B+ terminal 69, ground terminals 70, 71, a capacitor 72, and a diode 73.

The circuit shown in FIG. 15 operates as follows: The resonant circuit 37 analyzes the amplitude of the function $U=f(t)$ when a nep or boll enters the test probe 2. It is thereby possible to select such a resonant frequency for the resonant circuit that certain variations in the steepness of the leading edge of the pulse, caused by the shape of the specific defect, can be practically eliminated. The peak value of the pulse is then stored in the storage circuit 39 which comprises the diode 55 and the storage capacitor 56.

Since the resonant circuit 38 is reversely polarized relative to circuit 37, it is triggered only when the nep or boll leaves the test probe 2. The transit-time-discriminator 40 examines the time duration between the pulse caused by the entering of a defect into the test probe 2 and the pulse caused when said defect leaves the test probe 2. The peak value stored in capacitor 56 is discharged by discharging said capacitor 56 if after the entering pulse no leaving pulse follows within a fixed period of time which corresponds to the time required for a defect to pass the test probe 2.

The discriminator 40 operates as follows: The resonant circuit 63, 64 is triggered by means of tube 61 and coil 68 if the voltage across the capacitor 56 rises high enough to open tube 61. During the first half wave of the frequency of the resonant circuit 65, the diode 73 is biased in such a way that it represents a high impedance for the voltage at the input 59, 60 of the discriminator 40. During the second half wave of the frequency of resonant circuit 65, the diode 73 is biased reversely and it now represents a low impedance to the voltage at the input of the discriminator 40. Consequently, capacitor 56 discharges via said open diode 73. The condition for correct working of the discriminator 40 is practically fulfilled if the time duration of a half wave of the frequency of resonant circuit 65 corresponds to the transit time.

With the transit-time-discriminator 40, variations in the weight per unit of length of a fabric are not indicated if these variations cause a signal with a leading edge 4 which is not followed by a trailing edge 6 after a definite period of time. Accordingly, a very strict criterion is applied to the identification and classification of neps.

Instead of the discriminator 40 which is a circuit well known in the art, any other conventional type of discriminator, for instance, such using transistors instead of tubes, may be used.

FIG. 16 illustrates a recorder 74 known in the art. The recorder 74 is connected with its input terminals 75, 76 to the output of one of the filter means 11, 12, 13 and it records, by means of a pen 77, a curve 78 on a paper band 79 or the like. Curve 78 is an indication of the sporadically occurring defects.

FIG. 17 shows a known counter device 80 adapted to be connected with its input terminals 81, 82 to the output of one of the filter means 11, 12, 13. The illustrated counter indicates that 431 defects of a certain type have occurred.

FIG. 18 illustrates how the input voltage of an indicator device is adjusted. For instance, a voltage divider having resistors 83, 84 and 85 is connected to the output terminals $O_{11}$ of filter 11. A multi-position switch 86 connects, for instance, the input of counter device 80 to different taps 87, 88, 89 of the voltage divider.

FIG. 19 diagrammatically illustrates an apparatus for forming a mean value of the output magnitude of the converter device 9. A low pass filter 90 having a series resistor 91 and a shunt capacitor 92 is connected to the output of converter 9 and in parallel with the inputs of filters 11, 12, 13. The mean value obtained from the output 93, 94 of the low pass filter 90 controls a motor 95 which adjusts the settings of potentiometers 96, 97, 98 which are connected across the outputs of filters 11, 12, 13, respectively, whereby the sensitivity of the indicators 14, 15, 16 is adjusted in response to the mean value formed by low pass filter 90.

It is, of course, to be understood that the present invention is by no means limited to the particular arrangements shown in the drawings but also comprises any modification within the scope of the appended claims.

I claim:

1. An apparatus for classifying a number of sporadically occurring different phenomena in a variable function, such as defects in a textile material, into a like number of different defect classes, said apparatus comprising means for measuring said variable function, said measuring means including a test probe through which the material is passed, said test probe having an extension longitudinally of the passing material greater than the length of the defects to be classified, means for converting the measured variable function into an equivalent, variable, electrical function, electric filter means having inputs connected in parallel and connected to the output of said converting means, each filter means being adapted to selectively pass a specific Fourier component of the fundamental frequency of said electrical function, said component representing a certain phenomenon, and indicator means individually connected to the outputs of said filter means and individually indicating said specific components, said filter means individually comprising a transit-time-discriminator for discriminating pulses with a given time duration between their leading- and trailing edges for classifying different defects which are shorter than the test probe.

2. Apparatus for classifying sporadically occurring different phenomena in a variable function, such as defects in a textile material, said apparatus comprising means for measuring said variable function, said measuring means including a test probe through which the material is passed, said test probe having an extension longitudinally of the passing material greater than the length of the defects to be classified, means for converting the measured variable function into an equivalent, variable, electrical function, electric filter means having inputs, said inputs being connected in parallel to the output of said converting means, each filter means being adapted to pass selectively only one type of sporadically occurring characteristic pulse pattern, said characteristic pulse pattern representing a certain phenomenon, and indicator means individually connected to the outputs of said filter means and individually indicating said types of sporadically occurring characeteristic pulse patterns, said filter means individually comprising a transit-time-discriminator for discriminating pulses with a given time duration between ther leading- and trailing edges for classifying different defects which are shorter than the test probe.

References Cited by the Examiner

UNITED STATES PATENTS

| | | | |
|---|---|---|---|
| 2,602,836 | 7/52 | Foster et al. | 324—77 |
| 2,765,441 | 10/56 | Gambrill | 324—61 |
| 2,950,435 | 8/60 | Locher et al. | 324—61 |
| 2,950,436 | 8/60 | Butticaz et al. | 324—61 |
| 2,952,808 | 9/60 | Hurvitz | 324—77 X |
| 2,971,155 | 2/61 | Hurvitz | 324—77 |

OTHER REFERENCES

Nielsen et al.: "A Multichannel Noise Spectrum Analyzer For 10–10,000 Cycles," The Review of Scientific Instruments, vol. 25, No. 9, September 1954, pages 899–901.

WALTER L. CARLSON, *Primary Examiner.*

LLOYD McCOLLUM, FREDERICK M. STRADER, *Examiners.*